United States Patent
Voice et al.

(10) Patent No.: US 10,612,497 B2
(45) Date of Patent: Apr. 7, 2020

(54) WATER INJECTION TO INCREASE HYDROGEN PRODUCTION BY ON-BOARD REFORMING OF FUEL FOR AUTOMOTIVE INTERNAL COMBUSTION ENGINES

(71) Applicant: Saudi Arabian Oil Company, Dhahran (SA)

(72) Inventors: Alexander Karl Voice, Detroit, MI (US); Vincent Stanley Costanzo, Royal Oak, MI (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/961,386

(22) Filed: Apr. 24, 2018

(65) Prior Publication Data
US 2019/0323458 A1 Oct. 24, 2019

(51) Int. Cl.
*F02M 27/02* (2006.01)
*F02M 25/028* (2006.01)
(Continued)

(52) U.S. Cl.
CPC .......... *F02M 27/02* (2013.01); *F02M 25/028* (2013.01); *F02M 25/12* (2013.01);
(Continued)

(58) Field of Classification Search
CPC ........ F02M 27/02; F02M 26/19; F02M 26/22; F02M 26/53; F02M 25/028; F02M 23/12; F02M 31/20; F02M 2700/4321; F02M 25/022; F02M 67/06; F02M 25/032; F02M 25/035; F02M 25/038; F02M 25/10; F02M 15/12; F02M 26/43
See application file for complete search history.

(56) References Cited

U.S. PATENT DOCUMENTS 6,793,899 B2 9/2004 Bromberg et al.
8,061,120 B2 11/2011 Hwang
(Continued)

FOREIGN PATENT DOCUMENTS

FR 2928698 A1 9/2009
FR 2993933 A1 1/2014
(Continued)

OTHER PUBLICATIONS

International Search Report and Written Opinion, dated Sep. 24, 2019, for related PCT Application PCT/US2019/026872 filed Apr. 11, 2019.
(Continued)

Primary Examiner — Jacob M Amick
(74) Attorney, Agent, or Firm — Abelman, Frayne & Schwab

(57) ABSTRACT

The performance of an automotive gasoline fueled spark-ignited internal combustion engine (ICE) optionally operated with a dedicated exhaust gas recycle system is enhanced by reforming the fuel in the presence of injected water to increase the yield of hydrogen which permits higher compression ratios and suppresses engine knock associated with pre-ignition of the fuel. Reforming can occur (a) in the cylinder with the reaction of a fuel-rich mixture and steam from the water injected into the intake manifold of one or more dedicated exhaust gas recirculation cylinders; (b) in a catalytic reformer located upstream of the engine; (c) in a catalytic reformer located downstream of the engine that receives fuel and the exhaust gas stream from the dedicated exhaust gas recirculation cylinder(s), and returns cooled reformate to the intake manifold; and (d) in a catalytic reformer that receives fuel and the exhaust gas stream from the engine exhaust gas manifold, and delivers reformate to the intake manifold.

20 Claims, 14 Drawing Sheets

(51) Int. Cl.
F02M 25/12 (2006.01)
F02M 26/22 (2016.01)
F02M 26/19 (2016.01)
F02M 26/43 (2016.01)
F02M 31/20 (2006.01)

(52) U.S. Cl.
CPC ............ *F02M 26/19* (2016.02); *F02M 26/22* (2016.02); *F02M 26/43* (2016.02); *F02M 31/20* (2013.01)

(56) References Cited

U.S. PATENT DOCUMENTS

| | | |
|---|---|---|
| 2005/0022450 A1 | 2/2005 | Tan et al. |
| 2005/0279333 A1* | 12/2005 | Kweon ................ C01B 3/34 123/557 |
| 2008/0022680 A1 | 1/2008 | Gingrich et al. |
| 2013/0312384 A1 | 11/2013 | Hwang |
| 2016/0341157 A1* | 11/2016 | Henry .................. F02M 25/12 |

FOREIGN PATENT DOCUMENTS

| | | |
|---|---|---|
| JP | 2007332891 A | 12/2007 |
| JP | 2012225324 A | 11/2012 |
| JP | 05154800 B2 | 2/2013 |
| JP | 2013130179 A | 7/2013 |
| JP | 2014148946 A | 8/2014 |
| JP | 2016070100 A | 5/2016 |
| WO | 2004/091758 A1 | 10/2004 |

OTHER PUBLICATIONS

The Progress in Water Gas Shift and Stream Reforming Hydrogen Production Technologies - A Review (Abstract only), Trevor L. LeValley, Int'l Journal of Hydrogen Energy, vol. 39, Issue 30, Oct. 13, 2014, pp. 16983-17000.

Thermochemical Recovery Technology for Improved Modern Engine Fuel Economy - Part 1: Analysis of a Prototype Exhaust Gas Fuel Reformer (Abstract only), D. Fennell et al., RSC Advances, Issue 44, 2015.

New Powerful Catalysts for Autothermal Reforming of Hydrocarbons and Water-Gas Shift Reaction for On-Board Hydrogen Generation in Automotive PEMFC Applications (Abstract only) S. Wieland et al., SAE International, Paper No. 2001-01-0234, 2001.

Onboard Plasmatron Generation of Hydrogen for Extremely Low Emission Vehicles With Internal Combustion Engines (Abstract only), D. Cohen et al., Int'l Journal of Vehicle Design, vol. 17, Issue 5-6, 1996.

Study of an On-Board Fuel Reformer and Hydrogen-Added EGR Combustion in a Gasoline Engine, K. Ashida et al., SAE International J. Fuels Lubr. 8(2), 2015.

Autothermal Reforming and Wate-Gas Shift Double Bed Reactor for H2 Production From Ethanol (Abstract only), A. Nieto-Marquez et al., Chemical Engineering and Processing: Process Intensification, vol. 74, Dec. 2013, pp. 14-18.

A Compact Steam Reforming Reactor for Use in an Automotive Fuel Processor, Sean P. Fitzgerald et al., Pacific Northwest National Laboratory, Richland, WA.

Negative Valve Overlap Reforming Chemistry in Low-Oxygen Environments James P. Szybist et al., SAE Int'l, 2014-01-1188, Apr. 2014, pp. 418433.

Negative Valve Overlap; A Key to Controlling Lean, Gasoline Auto-Ignition?, Richard Steeper, Combustion Research Facility, Oct. 2013.

Emissions From Heavy-Duty Diesel Engine With EGR Using Fuels Derived From Oil Sands and Conventional Crude, W.S Neill et al., Presented at the 2003 SAE Powertrain & Fluid Systems Conference & Exhibition, Oct. 2003, Pittsburgh, Pennsylvania.

\* cited by examiner

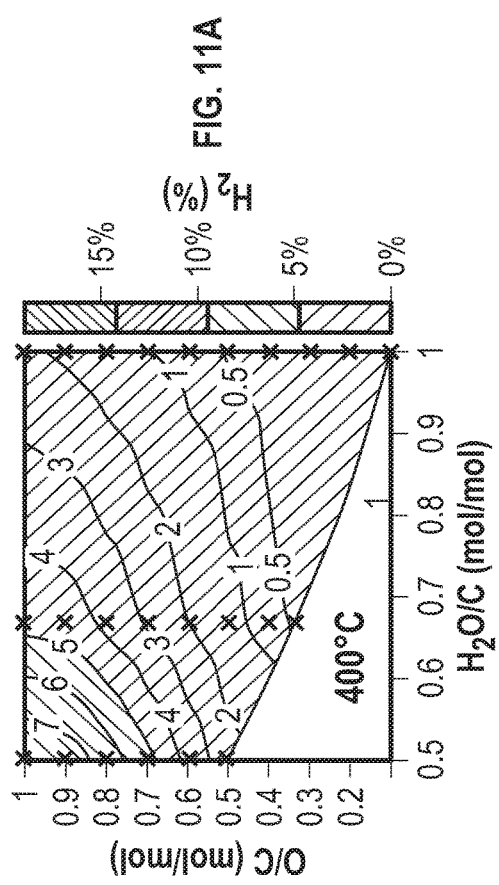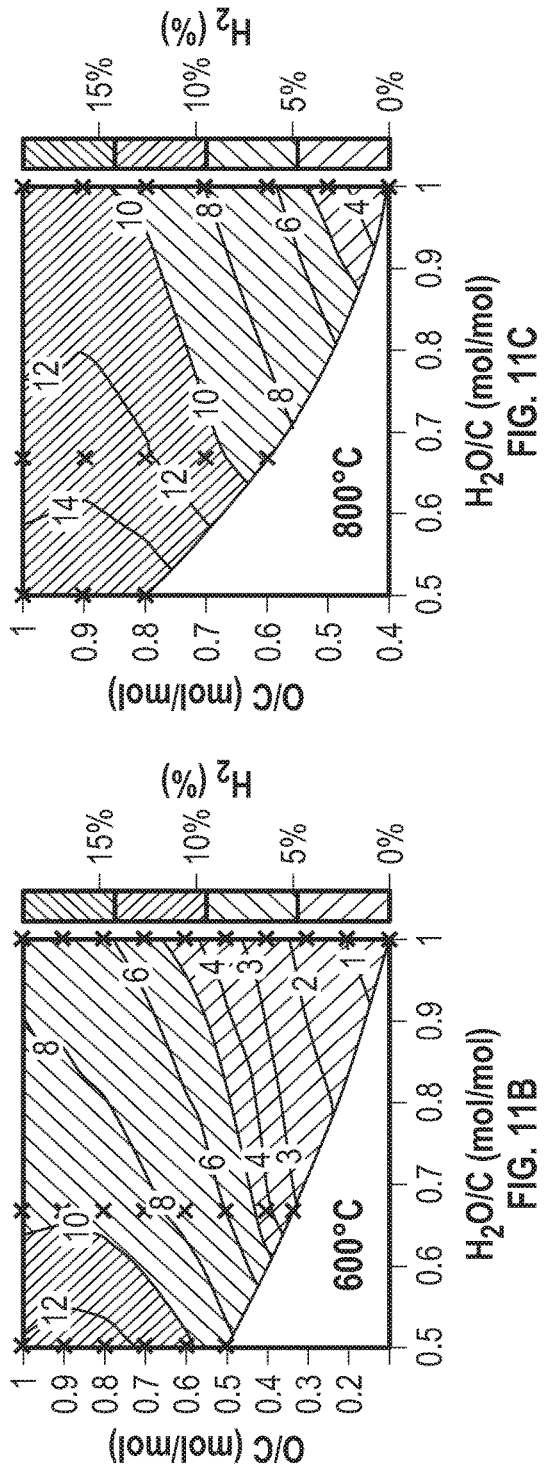
FIG. 11A 400°C
FIG. 11B 600°C
FIG. 11C 800°C

WATER INJECTION TO INCREASE HYDROGEN PRODUCTION BY ON-BOARD REFORMING OF FUEL FOR AUTOMOTIVE INTERNAL COMBUSTION ENGINES

BACKGROUND OF THE INVENTION

Field of the Invention

The present invention relates to the operation of an automotive spark-ignition internal combustion engine (ICE) with an integrated on-board fuel reforming system with water injection to increase hydrogen content in the produced reformate gas mixture.

Description of Related Art

On-board reforming refers to the process of converting fuel into a hydrogen-rich reformate gas. Preferred processes favor $H_2$ and CO production over $H_2O$ and $CO_2$ production; however, the yields are limited by overall fuel conversion, competition between various reforming reactions and by the hydrogen and carbon content of the fuel. Addition of water to the combustion mixture increases the rate of steam reforming reactions, effectively converting some of the hydrogen in the water into $H_2$, thereby increasing the overall quantity of $H_2$ in the produced reformate gas.

Various methods are known to the art to increase industrial hydrogen plant output utilizing the water-gas shift reaction and steam-methane reforming chemistry, including management of process temperatures and pressures, catalyst selection, and steam injection. Current methods of on-board reforming include exhaust gas reforming with injection of fuel into a hot exhaust gas stream in the presence of a catalyst downstream of one or more cylinders and the partial oxidation of the fuel before entering the engine, or in the engine. Although hydrogen production can be improved by favoring partial oxidation, exemplified in the Table below as reaction (1), over complete oxidation, e.g., reaction (2). For example, by combusting the fuel in the engine under rich conditions, the maximum theoretical yield is limited by the hydrogen content of the fuel. Post-engine exhaust reforming processes recycle some of the water in the exhaust gas to produce hydrogen. However, the water available in these processes is limited to that produced during the combustion process. Additionally, the catalyst may be subject to reduced performance over time due to fouling and deactivation.

For example, using iso-octane, C8H18, as a typical gasoline component, Table A below provides the heat of reaction for the indicated reaction scenarios, in which a positive value indicates an endothermic reaction and net enthalpy increase, and a negative value indicates an exothermic reaction and net enthalpy decrease.

TABLE A

| EQ. | REACTION TYPE | REACTION | $\Delta Hr°$ |
|---|---|---|---|
| 1 | Partial oxidation | $C8H18 + 4O_2 \rightarrow 8CO + 9H_2$ | −660 kJ/mol |
| 2 | Complete oxidation | $C8H18 + 12.5O_2 \rightarrow 8CO_2 + 9H_2O$ | −5100 kJ/mol |
| 3 | Steam Reforming 1 | $C8H18 + 8H_2O \rightarrow 8CO + 17H_2$ | 1274 kJ/mol |
| 4 | Steam Reforming 2 | $C8H18 + 16H_2O \rightarrow 8CO_2 + 25H_2$ | 945 kJ/mol |

However, these techniques have not been applied to on-board automotive reforming applications of gasoline in which hydrogen and carbon monoxide are both beneficial constituents in the combustion cycle.

Water or steam injection in automotive ICE systems has been proposed for various purposes, including charge cooling, knock reduction, removal of combustion chamber deposits, and reduction of emissions, e.g., NOx and soot, in diesel engines.

Various methods exist to increase the dilution tolerance of spark-ignited engines which do not rely on the generation of syngas. However, these systems are costly, unproven and, ultimately, limited in the amount of dilution tolerance provided. Furthermore they do not have the combined benefit of also improving knock tolerance in the way that on-board reforming does.

Production vehicles with gasoline-fueled four-cycle internal combustion engines employ a variety of engineered strategies to mitigate knock and reduce throttling losses while improving fuel economy by increasing the engine's compression ratio. These efforts have included Miller-cycle operation at knock-limited conditions, use of direct injection to provide additional charge cooling, optimized valve timing to scavenge residuals, external and internal exhaust gas recirculation, or EGR, retarding spark timing at high load, and hydrogen boosting.

On-board reforming concepts that are currently in the demonstration phase, but not in commercial production add another tool to further improve efficiency, which can be used in addition to, or instead of many other strategies for knock mitigation. For example, the dedicated exhaust gas recycle system combines the benefit of recirculated exhaust gas with the combustion benefits of reformed fuel. The fuel reformation process occurs inside a power cylinder that is operated with excess fuel. Rich combustion leads to the formation of hydrogen ($H_2$) and carbon monoxide (CO) in the exhaust gas stream, which are then cooled and recirculated to the engine. Since the fuel reformation occurs in a power-producing cylinder and all the combustion products are recirculated, the effect is to partially overcome engine limitations that have reduced spark-ignition engine efficiency, such as thermal losses, pumping work losses and engine knock. At low EGR levels, increasing the EGR rate leads to increased efficiency. Eventually, however, the engine reaches a limit where the efficiency no longer improves with additional EGR. The efficiency limiting mechanisms are associated with combustion efficiency and flame speed. Although recirculated exhaust gas at high levels slows combustion reaction rates, thereby reducing engine knock, it also reduces the flame speed, which leads to unstable combustion, particularly at low power conditions.

A problem addressed by the present disclosure is obtaining additional improvements in the operation of various on-board reforming systems to increase hydrogen production.

As used in this disclosure, the terms "boosted" or "boosting" refer to the use of a turbocharger or a supercharger to compress the intake air to the engine.

The term "heat exchanger" also includes automotive intercoolers.

SUMMARY OF THE INVENTION

This invention is directed to the use of water injection to increase the hydrogen yield in on-board automotive reforming systems by converting the gasoline fuel into a mixture of hydrogen and carbon monoxide, or syngas, which then undergoes the water-gas shift reaction to produce additional hydrogen and carbon dioxide. The syngas is produced either through partial oxidation by combusting the fuel under oxygen-deficient fuel-rich conditions or by the reaction of gas mixtures containing carbon dioxide, water vapor, or other oxidants. The carbon monoxide reacts with the water present to produce additional hydrogen and carbon dioxide in the water-gas shift reaction. The water also reacts directly with the fuel to form hydrogen, carbon monoxide, and carbon dioxide.

The invention includes systems and methods in which the reforming of the fuel occurs in a reciprocating engine's cylinder, as well as those which utilize additional apparatus and processes external to the engine. In-cylinder reforming is known in the art, and this invention further improves the reforming process by injecting water into the cylinder primarily to improve hydrogen production at the expense of carbon monoxide, as well as through direct steam-reforming of the fuel. Water reacting with fuel, carbon monoxide, or other partial combustion products improves the hydrogen yield and thereby increases the overall performance of the vehicle for the reasons described in more detail below.

As used in this disclosure, the term "external reforming" refers to a method, system or apparatus where the reforming reaction occurs outside of the cylinder, as distinguished from in-cylinder reforming.

Another benefit of water addition to on-board reforming systems is the improvement in both the operability and durability of the reforming system by reducing soot production, thereby extending the rich limit for in-cylinder reforming systems or the maximum fuel loading, catalyst efficiency, throughput, and lifetime for the external reforming systems.

Test results have demonstrated that hydrogen yield can be increased via the water-gas shift reaction and Le Chatlier's principle, and that this increased hydrogen yield can significantly improve engine performance. Addition of water to the intake system of the ICE effectively increases the humidity of the exhaust gas which is typically about 12%, and thereby increases hydrogen yield when fuel is added to the hot exhaust gas stream upstream of the catalytic reformer, or introduced directly into the catalytic reformer.

It has also been found that water injection substantially increases hydrogen yield at higher catalyst temperatures and improves thermochemical recuperation of exhaust enthalpy as shown by a positive energy balance. The following have been found to be effective for maximizing the hydrogen yield and the fuel energy balance: a reformer inlet composition of approximately 0-7.5 mol % oxygen, 10-30 mol % steam, and 1-3 mol % fuel. The reformer inlet stream should also have a steam/carbon (S/C) mole ratio of 1.5-3, with the optimum S/C ratio being 1.5, an oxygen/carbon ratio of 0.5-1.0, with the optimum being 0.9, and a steam concentration greater than 15 mol %.

Furthermore, it has been demonstrated that in-cylinder reforming can be improved through the use of water enrichment. Humidification of the intake air entering a spark-ignited engine operating under rich conditions increases hydrogen production. The following are shown to be effective: a molar water concentration of less than 36%, and an in-cylinder relative air-to-fuel equivalence ratio of greater than 0.65.

As used here, the air-to-fuel equivalence ratio ($\lambda$) is defined as the ratio of the actual air-to-fuel ratio to the stoichiometric air-to-fuel ratio, and the fuel-to-air equivalence ratio ($\varphi$) is defined as the ratio of the actual fuel-to-air ratio to the stoichiometric fuel-to-air ratio.

The methods and systems of this disclosure result in improved spark ignition gasoline engine efficiency by enabling higher compression ratios, improving combustion phasing, reducing throttling losses, and by recycling part of the exhaust enthalpy into useable fuel energy. Importantly, the system can be adapted for use with existing automotive ICE configurations with a minimum of engineering and design changes and their associated expense.

The effectiveness of methods employing a fuel-reforming or water-gas shift catalyst in the absence of supplemental water injection is limited by the water available in the exhaust produced by combustion. Use of a water-gas shift or fuel-reforming catalyst with water injection upstream of the cylinder will significantly increase hydrogen yield to the cylinder intake.

Water injection can also improve on-board reforming systems of the prior art by steam-cleaning the catalyst, cylinder and other engine components on which coke and other carbonaceous materials may form deposits. The build-up of carbon deposits in the reforming cylinder has been one of the obstacles to commercializing the dedicated EGR engine technology and this problem is addressed by the present invention.

Water injection for the purpose of increasing hydrogen yield in any engine is novel, especially so when used in combination with an on-board reforming system.

Comparative studies have shown that hydrogen in syngas produced from reformed fuel provides greater benefits than carbon monoxide, and constitutes an improved method for increasing hydrogen yield in dedicated exhaust-gas recirculation engines and other vehicles utilizing on-board reforming systems.

Some of the additional capital cost and maintenance requirements associated with the on-board water injection system are offset by benefits such as intake air cooling which reduces knock tendency and improves power density, reducing peak temperature, which also reduces knock, reducing NOx formation, reduced exhaust particle mass/particle numbers (PM/PN), and removal of combustion chamber deposits.

Engine Efficiencies

The systems and processes of the present disclosure address two of the fundamental barriers to improving spark-ignited gasoline engine efficiency: low compression ratio and throttling losses. It is well known in the art that throttling losses result from the manifold pressure being reduced by the closing of the throttling valve, resulting in negative pumping work that is proportional to the difference in the manifold and ambient pressures. The effect is a loss in engine efficiency. These effects are illustrated graphically in FIGS. 5A and 5B. The well-known Pressure vs. Volume plot shows the representative loss in the shaded area in FIG. 5A compared to an ideal or theoretical representation of the Otto cycle engine in FIG. 5B.

The thermodynamic cycle for gasoline engines can be represented using an ideal Otto cycle, the efficiency of which can be expressed by the following equation:

$$\eta = 1 - (1/r^{(\gamma-1)}) \tag{5}$$

where $\eta$ is the cycle efficiency, r is the compression ratio, and $\gamma$ is the ratio of the constant pressure and constant volume heat capacities of the working fluid. Since $\gamma$ is always greater than 1 for practical working fluids, a higher value of the compression ratio r where a larger value of the exponent ($\gamma-1$) increases the denominator in equation (5) which results in greater value for the engine cycle efficiency.

In practice, r is limited by the abnormal combustion phenomenon known as engine knock. Knock results when high temperatures and pressures in the end-gas, which is defined as the unburned gas in front of the propagating flame, cause the end gas to autoignite, generating high-pressure waves which can result in engine noise and, if persistent, can cause damage to bearings and other components of the engine. Higher compression ratios increase end-gas temperatures and pressures, increasing the likelihood of autoignition and engine knock. Fuel compositions that are resistant to autoignition allow the engine to operate at higher compression ratios.

Blending syngas with fuel improves autoignition resistance of the end-gas, allowing higher compression ratios to be used while avoiding knock. Hydrogen has a much greater effect on autoignition resistance than carbon monoxide due to the faster rate of reaction of the hydrogen radical. This allows the compression ratio to be increased, as well as improved spark timing, thereby directly improving the ideal Otto cycle efficiency. These results are shown in Table 1 below, which identifies the reaction rate constants (k) for the reactions of equations (6) and (7) at each of the three temperatures and the relatively higher compression ratios attainable with hydrogen vs. carbon monoxide.

$$CO + OH^* \rightarrow CO_2 + H^* \quad (6)$$

$$H_2 + OH^* \rightarrow H_2O + H^* \quad (7)$$

TABLE 1

Rate constants (k) for reaction of $H_2$ and CO with hydroxyl radical

| Temperature | k (equation 6) | k (equation 7) | Ratio |
| --- | --- | --- | --- |
| 600 | 1.12E+11 | 1.79E+11 | 1.6 |
| 700 | 1.31E+11 | 3.40E+11 | 2.6 |
| 800 | 1.52E+11 | 5.65E+11 | 3.7 |

The higher Brake Mean Effective Pressure (BMEP) resulting from operating at a higher compression ratio allows further downsizing of the engine, thereby reducing heat transfer and friction inefficiencies for the same power output.

Hydrogen blending also significantly improves combustion stability, facilitating greater levels of exhaust gas recirculation (EGR) or dilute lean operation. This allows the throttle to be opened further at part-load, thereby reducing pumping losses and negative work as discussed above in conjunction with FIGS. 5A and 5B, as well as by improving the value of γ in equation (5) above.

As shown in Table 2, hydrogen exhibits a maximum laminar flame speed that far exceeds that of carbon monoxide and iso-octane, and also has a very much lower lean flammability limit than either of the other fuel components.

TABLE 2

Combustion properties of indicated fuels

| | Hydrogen | Carbon Monoxide | Iso-Octane |
| --- | --- | --- | --- |
| Maximum Laminar Flame Speed [cm/s] | 325 | 52 | 41 |
| Lean or Lower Flammability Limit (LFL) Fuel/Air [mass ratio] | 0.0029 | 0.1379 | .0377 |

Fuels with a lower lean limit expressed in terms of the fuel-to-air ratio can be used to reduce losses caused by other power management systems, such as throttling losses.

Effects of Fuel Formulation

Modifications of conventional fuel formulations have also been found to perform synergistically with on-board reforming systems by generating greater amounts of hydrogen, maximizing the knock and dilution tolerance benefits of reformate blending, and requiring shorter residence times to complete reforming outside the engine cylinder. Percentages discussed below and employed in the claims are in terms of molar concentrations and are based on the total amount of the combustion mixture. For convenience, the molar percentages may be recited below simply as a percentage, i.e., "%".

Fuels containing about 1 mol % or less of aromatics compared with the typical 25-35% present in standard gasoline formulations, have been found to improve on-board reforming systems in several distinct ways.

One way in which these lower aromatic content fuel blends improve performance is that the greater hydrogen content of these fuels results in the production of more hydrogen-containing compounds, e.g., $H_2$ and $H_2O$. As discussed above, hydrogen provides greater benefits for reducing autoignition and dilution tolerance than CO.

Another benefit of the low aromatic content of the fuel in the reforming process is improved hydrogen selectivity, i.e., $H_2$ vs. $H_2O$. A greater proportion of $H_2$ improves dilution tolerance and reduces auto-ignition, whereas $H_2O$ does not improve dilution tolerance. Low aromatic-content fuels also exhibit a greater resistance to auto-ignition than high aromatic-content fuels when mixed with hydrogen-rich gas.

Furthermore, fuels with lower aromatic content that contribute to a higher H/C ratio are less likely to produce soot when combusted under rich conditions, and therefore are less likely to cause catalyst coking and deactivation.

Another benefit of using these fuels is that they can be combined with easier-to-reform oxygenates, which generate synergistic benefits such as regaining the octane values that may be reduced by lowering the aromatic content, maintaining high energy density, further increasing the H/C ratio, and having shorter residence times in external reforming systems.

In addition, fuels with a lower aromatic content than conventional fuel blends provide a more favorable energy balance during the reforming process than fuels with a high aromatic content. This means that more energy can be extracted from the hot exhaust gas and converted into useful fuel energy for the lower aromatics fuels blends.

Based on this analysis, fuels containing about 1 mol %, or even less, of aromatic compounds will improve the performance and conversion rate of an on-board reforming system, and are therefore preferred. However, significant improvement over conventional fuel blends can be achieved with an aromatic content in the range of from 1 to 10 mol %. As will be apparent to one of ordinary skill in the art, the availability and economics of fuel blending components will necessarily play a role in formulating the fuel blend.

Suitable reforming catalysts include catalysts that comprise at least one active metal selected from groups VI, VII and VIIIB of the Periodic Table, i.e., IUPAC groups 6-10. A catalyst containing rhodium has been found to be suitable. The catalyst was prepared with somewhat less than 2% by weight of Rh in an alumina wash coat on a cordierite substrate.

BRIEF DESCRIPTION OF THE DRAWINGS

The invention will be further described below and with reference to the attached drawings in which the same or similar elements are identified by the same number, and in which:

FIGS. 11A, 11B and 11C are a series of comparative plots showing the yield of hydrogen at three temperatures as a function of the ratio of oxygen-to-carbon (molar);

DETAILED DESCRIPTION OF THE INVENTION

The process and system of the disclosure will be described with reference to illustrative embodiments that are directed to external reforming and in-cylinder reforming schematic diagrams for spark-ignition gasoline fueled ICE automotive applications.

As will be understood by one of ordinary skill in the art, conventional elements such as fuel and water pumps, turbochargers and/or superchargers (also collectively referred to as "boosters"), valves, injectors, sensors, control devices, electrical wiring and the engine management control system (EMS) are not shown in these simplified schematic diagrams for convenience and to facilitate an understanding and explanation of the principal features and operational characteristics of the respective embodiments of the present disclosure.

Figure 1:
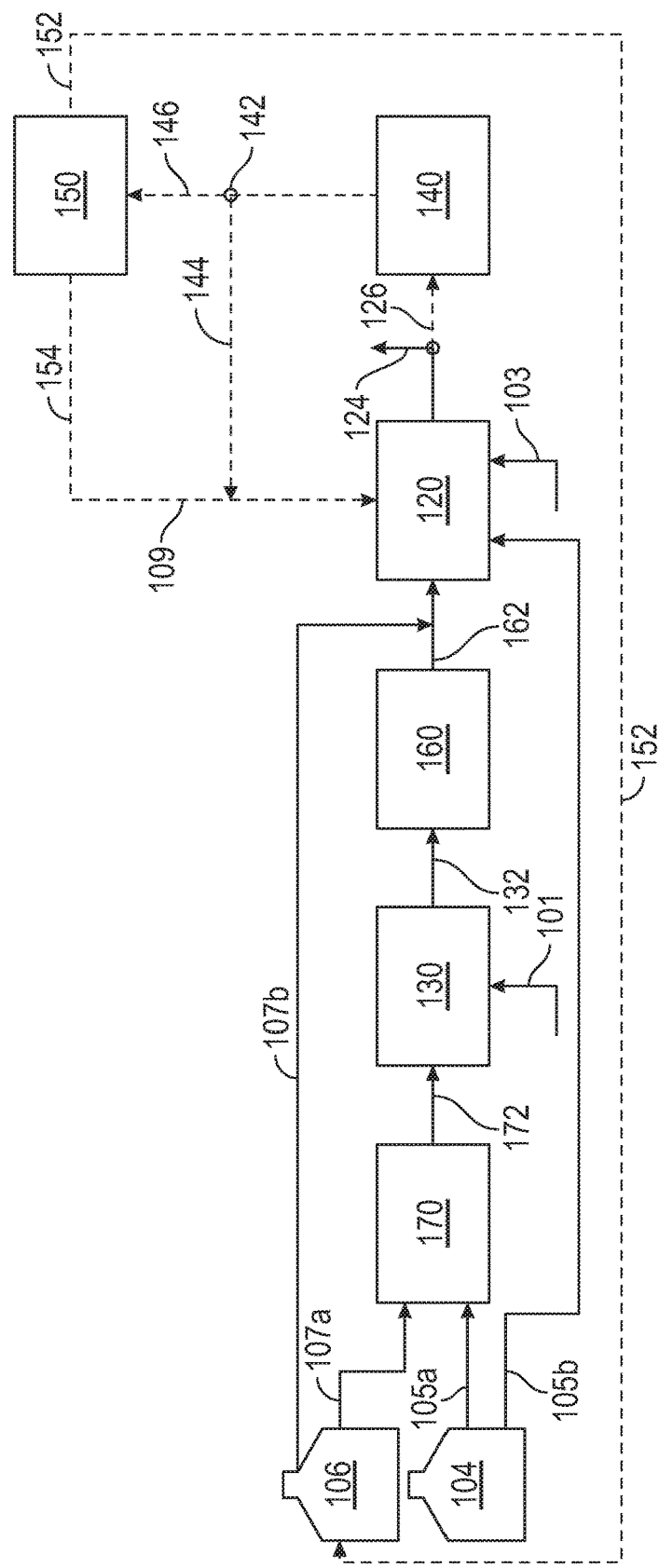
FIG. 1 is a process flow diagram for an intake catalyst reforming system with water injection.

Referring to FIG. 1, a simplified process flow diagram for intake catalyst reforming with water injection to the reformate will be described. For convenience, the integrated system as illustrated with a four-cylinder ICE includes a fuel tank 104 and a water source, e.g., a water storage tank or vessel 106.

Water is passed through line 107a and fuel through 105a to vaporizer 170 where they are heated to a temperature that will vaporize the water. The vaporized fuel and steam mixture 172, and air 101 are introduced into on-board reformer 130 where they are catalytically reformed to initially produce a hot reformate comprising hydrogen and carbon monoxide, i.e., syngas, that is then converted in the water-gas shift reaction to an increased amount of hydrogen and carbon dioxide. The hydrogen-enhanced reformate stream 132 is optionally cooled to a temperature in the range of from 25° to 70° C. in heat exchanger 160 to produce a cooled $H_2$-enhanced reformate stream 162.

In an embodiment, a sensor transmits a signal corresponding to the temperature of reformate exiting the reformer to the on-board engine management system, or EMS, for comparison with a signal from an ambient air temperature sensor. If the reformate temperature exceeds the predetermined desired range, it is passed to the on-board ambient air heat exchanger for controlled reduction of the reformate temperature to within the range.

The cooled reformate 162 is injected with additional water from line 107b and passed to the engine 120 with fuel 105b, air 103, and water 107 to undergo combustion and to produce a hot exhaust gas stream 122. Some or all of the hot exhaust gas may be discharged to the atmosphere via 124.

In an optional EGR embodiment also illustrated in FIG. 1 and indicated by the dotted process flow lines, some or all of the hot exhaust gas 122 can be sent as ERG stream 126 to heat exchanger 140 to reduce its temperature. Some or all of the cooled exhaust gas 142 can be recycled via lines 144 and 109 directly to the engine 120. Optionally, some or all of the cooled exhaust gas 142 can be passed via control valve 142 and line 146 to condenser 150 to remove and capture some or all of the water vapor for recycling via line 152 to water storage tank 106. In an embodiment, condensed water via line 154 can be injected into the reformate stream 162. Some or all of the ERG can be recycled via line 154 to the engine 120 via loop 109.

Figure 2:
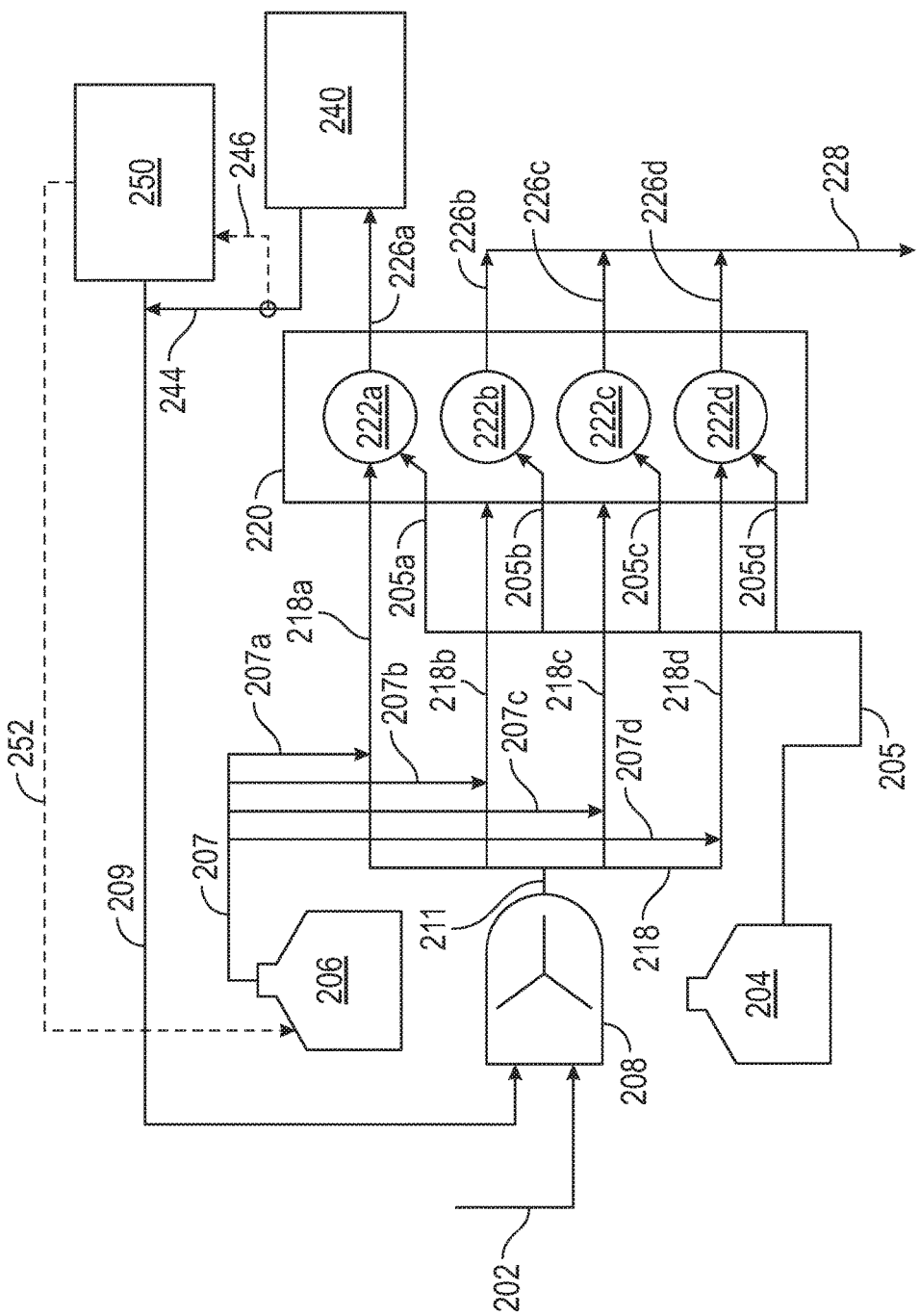
FIG. 2 is a process flow diagram for an in-cylinder reforming system with water injection.

Referring now to FIG. 2, a process flow diagram illustrating an embodiment of a system for in-cylinder catalytic reforming with water injection. The integrated system includes a fuel tank 204 with fuel line 205 and a water tank 206 with water line 207.

The EGR embodiment of FIG. 2 operates with an exhaust gas recycle loop 209. As illustrated for the purpose of this description, a single cylinder 222a of ICE 220 can serve as a dedicated source for the EGR. Alternatively, EGR can be collected from more than one cylinder in accordance with methods known in the art. Although FIG. 2 illustrates a four cylinder engine, it will be understood by one of ordinary skill in the art that the engine can have any number of cylinders. It will also be apparent to one of ordinary skill in the art that the engine can utilize auxiliary boost devices, e.g., a turbocharger or a super charger, for compressing the intake air or air mixture, and that the mixing of air with the EGR may occur before or after passing through these boost devices.

A cooled exhaust gas recycle stream 209, the source of which is described below, and atmospheric air 202 are mixed in EGR mixer 208 and introduced into intake manifold 218 as a mixed air/EGR stream 211. Water from tank 206 is injected into manifold 218, or at each of the cylinder intakes 218a-218d via lines 207a-207d. The mixed air/EGR stream 211 and water streams 207a-207d are drawn into cylinders 222a-222d of engine 220.

A predetermined quantity of fuel from line 205a is injected into engine cylinder 222a before or during an intake stroke to provide a fuel-rich mixture in the dedicated EGR cylinder in accordance with the EMS program. In this embodiment, the fuel-rich mixture in cylinder 222a results simultaneously in the combustion of only a portion of the fuel and the reforming of the excess unburned fuel. The combustion and reforming in cylinder 222a in the presence of the injected water produces a hot exhaust gas stream 226a where the reformate comprises hydrogen and carbon dioxide as a result of the water-gas shift reaction.

Fuel is injected into each of the other cylinders 222b-222d in a stoichiometric amount that is predetermined, e.g., by the engine management system (not shown), to undergo complete combustion with the air in these cylinders. The combustion in cylinders 222b-222d produces hot exhaust gas streams 226b-226d of conventional composition that are discharged to the atmosphere via conventional exhaust manifold 228.

Hot exhaust gas and reformate stream 226a is passed to heat exchanger 240 to be reduced in temperature to a predetermined range by heat exchange with ambient air. Some or all of the cooled exhaust gas is recycled via lines 244 and 209 directly to EGR mixer 208 that is in fluid communication with intake manifold 218. Optionally, some or all of the cooled exhaust gas 246 can be passed to condenser 250 to recover some or all of the water for recycling via 252 to water storage tank 206. The operation of the heat exchanger 240 and optional condenser can be controlled as described above in connection with FIG. 1.

Figure 3:
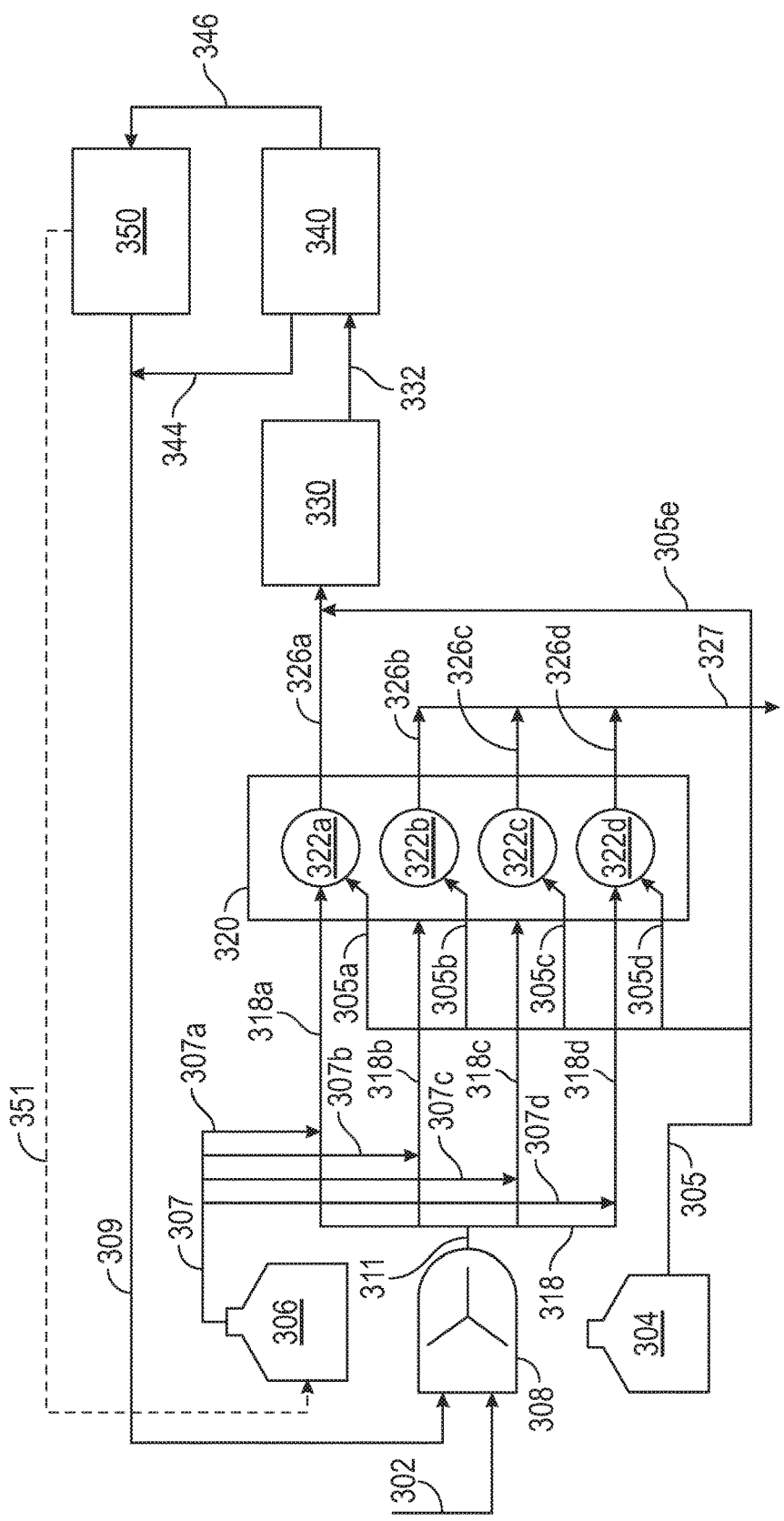
FIG. 3 is a process flow diagram for an exhaust gas catalyst reforming system with water rejection.

With reference to FIG. 3, a process flow diagram of an embodiment for exhaust-gas catalytic reforming with water injection for ICE 320 is illustrated. The integrated system includes a fuel tank 304 with fuel line 305 and a water tank 306 and associated water line 207. While the engine 320 as illustrated has 4 cylinders, it will be understood by one of ordinary skill in the art that the engine 320 can have any number of cylinders.

Intake air 302 and a cooled reformate EGR stream 309, the source of which is described below, are mixed in EGR mixer 308 to produce a mixed air/reformate EGR stream 311 that is drawn into intake manifold 318. The mixed air/reformate EGR stream 311 and water streams 307a-307d are introduced into the cylinders 322a-322d of engine 320 in a manner similar to that described above in connection with FIG. 2.

Fuel via lines 305a-305d is optionally injected into the engine cylinders 322a-322d for combustion under fuel-lean/oxygen-rich conditions.

The combustion in cylinders 322b-322d produces hot exhaust gas streams 326b-326d, containing residual oxygen, which is discharged to the atmosphere via exhaust system 327. As will be understood by one of ordinary skill in the art, the EMS will have to be programmed to accept the presence of oxygen detected by exhaust gas sensors without modifying the pre-programmed fuel flow to cylinders 222b-222d. The combustion in cylinder 322a produces a hot exhaust gas stream 326a also containing residual oxygen, which is mixed, i.e., by injection with fuel introduced via fuel line 305e before entering catalytic reformer 330. A post-combustion fuel injection event in cylinder 322a during or prior to the exhaust stroke can be used in place of a separate fuel injector to deliver the fuel for reforming with the oxygen in the exhaust gas from cylinder 322a to initially produce hydrogen and carbon monoxide which is converted via the water-gas shift (WGS) reaction to increase the amount of hydrogen in an $H_2$-enhanced reformate.

Enhanced reformate stream 332, comprising the exhaust gases, hydrogen and carbon dioxide from the WGS reaction is passed from reformer 330 to heat exchanger 340 to reduce its temperature within a desired range. Some or all of the cooled exhaust gas can be recycled via lines 344 and 309 directly to the EGR mixer 308. Optionally, some or all of the cooled exhaust gas can be sent via line 346 to condenser 350 to recover some or all of the water vapor contained for recycling via line 351 to water storage vessel 306. The functioning of and control of the heat exchanger and condenser are as described above in connection with FIG. 2. Although engine 420 as illustrated has 4 cylinders, it will be understood by one of ordinary skill in the art that the engine can have any number of cylinders.

Figure 4:
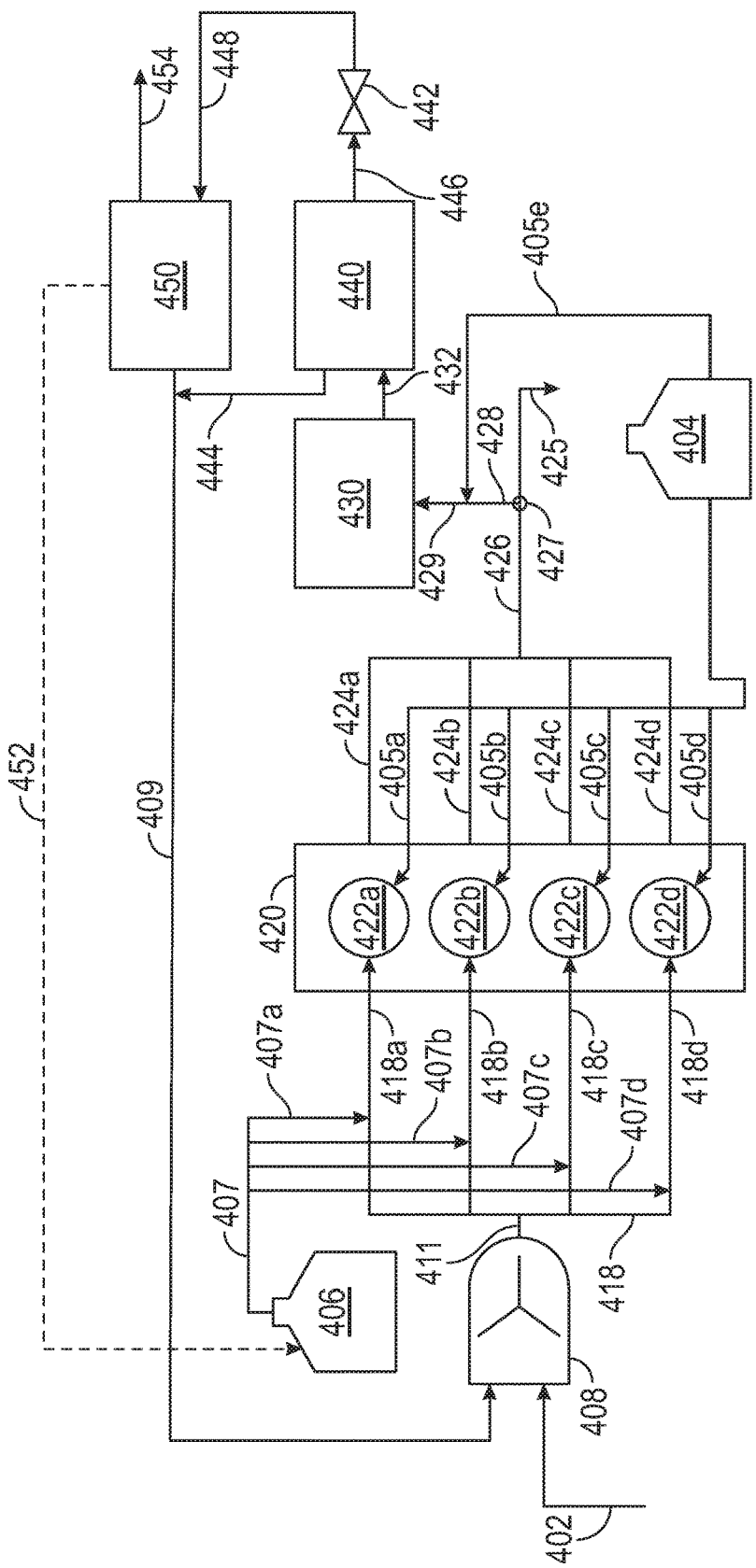
FIG. 4 is a process flow diagram for an exhaust gas catalyst reforming system with water injection and use of a post-combustion injection event to provide fuel for the reformer.
Figure 5A:
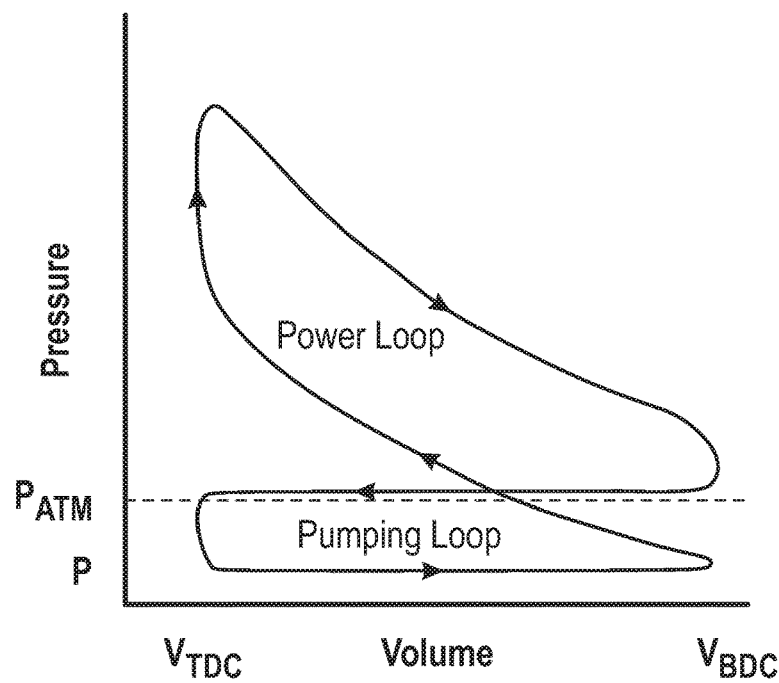
FIGS. 5A and 5B are representative prior art power curves representing the idealized Otto cycle graphically illustrating the effect of throttling losses.
Figure 5B:
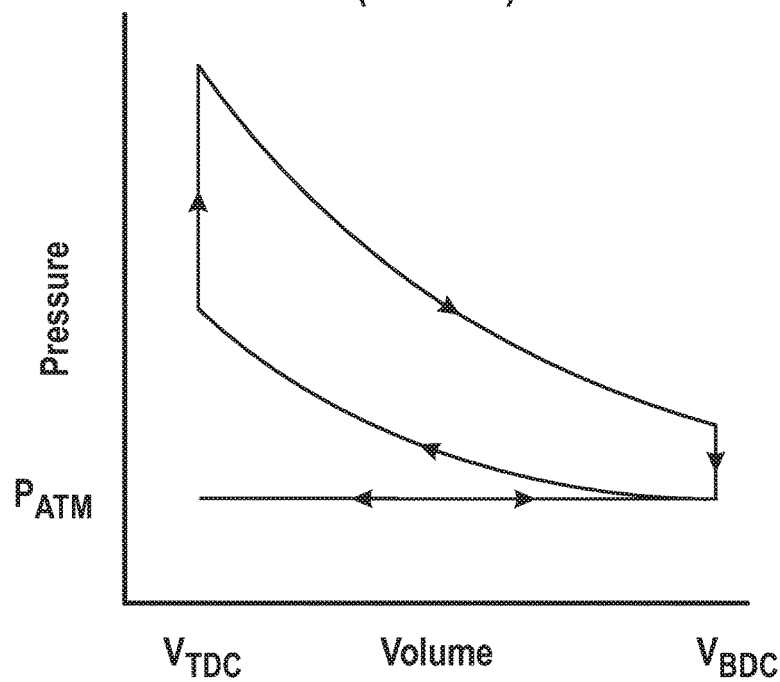

Referring now to FIG. 4, a process flow diagram of an embodiment of an exhaust gas catalytic reforming system with water injection and post combustion fuel injection for an ICE 420 is shown. The integrated system as illustrated a fuel tank 404 and a water storage vessel or tank 406.

A cooled reformate EGR stream 409, the source of which is described below, and atmospheric air 402 are mixed in an EGR mixer 408 to produce a mixed air/reformate EGR stream 411 that is drawn into intake manifold 418 of the ICE. The mixed air/reformate EGR stream 418a-418d and water streams 407a-407d are introduced into the cylinders 422a-422d of engine 420 in a manner similar to that described above in connection with FIG. 2. Fuel from fuel tank 404 passed via lines 405a-405d is optionally injected into the engine cylinders 422a-422d for combustion under fuel-lean/oxygen-rich conditions.

The combustion in cylinders 422a-422d produces hot exhaust gas streams 424a-424d containing residual oxygen that pass via an exhaust manifold and are combined to form a combined hot exhaust gas stream 426 containing residual oxygen. Some of the combined hot exhaust gas stream 426 is passed as stream 428 and is combined with fuel injected from line 405e to form combined hot exhaust gas/fuel mixture 429 that is introduced into catalytic reformer 430 to produce a reformate stream 432 containing an enhanced amount of hydrogen from the WGS reaction as was described above in connection with FIG. 3.

The remainder of the combined hot exhaust gas stream 426 is discharged to the atmosphere via line 425.

Reformate stream 432, comprising exhaust gases, an enhanced amount of hydrogen, and carbon dioxide from the WGS reaction, is sent to heat exchanger 440 to reduce its temperature to within a predetermined range. Some or all of the cooled reformate gas stream is passed as stream 444 for recycling via line 409 directly to the EGR mixer 408.

Optionally, some or all of the cooled reformate can be passed via line 446 through EGR valve 442 and via line 448 to condenser 450 to condense and recover some or all of the water for passage via line 452 to water tank 406 or, optionally, directly to line 407 and the intake manifold lines 418a-418d. Alternatively, condensate can be discharged to the atmosphere via line 454.

As will be apparent from the methods and systems described, water injection requires a supply of water to be stored onboard the vehicle. The water storage system can be provided with one or more sensors associated with the EMS and visual/audible device to indicate the amount of water and to control the path of any condensate including its direct discharge into the atmosphere, transfer to the storage vessel or passage directly to an engine component. Although condensate water can be recovered from the exhaust gas stream, depending on the rate of its consumption, motorists will be required to periodically add water to the vehicle just as they add fuel, washer fluid, oil, or urea/diesel exhaust fluid. The interval for replenishing the water will depend on the amount of water used for hydrogen production. Water injection can be predetermined in accordance with the region in which the vehicle will be operating in order to maximize the interval between the fillings.

In each of the four embodiments described above, an intercooler, or heat exchanger is provided to cool the exhaust gas recycle stream either directly or downstream of the reformer for its introduction into the ICE. It will be understood that some energy losses due to fluid frictional forces and turbulence are also incurred in the passage of the reformate through the heat exchanger/intercooler. Thus, some efficiencies and overall performance benefits can be achieved if the reformate is passed to the heat exchanger/intercooler only when the temperature exceeds a predetermined value that also takes into account ambient air temperature, e.g., resulting from seasonal and/or geographic variations.

In an alternative embodiment, appropriate temperature sensors, flow rate meters and valves that are linked to an appropriately programmed engine control unit or engine management system will optionally by-pass the heat exchanger/intercooler and pass the reformate directly to the ERG loop, or optionally pass the reformate stream to the condenser for recovery of water vapor. In the latter embodiment, it will be understood that the temperature of the reformate stream is reduced to a point at which some or all of the water is condensing.

If the volume of reformate that is mixed with the intake air is relatively low, e.g., at lower engine rpm's, and/or if the ambient air is at a relatively low temperature, the overall performance benefits of cooling the reformate may be minimal. For example, if the ICE is to be operated in a consistently cool or cold environment, the overall system cost can be reduced by eliminating the heat exchanger or intercooler.

Specific advantages and benefits of the embodiments of FIGS. 1-4 will be illustrated by data described, analyzed and presented in the graphical plots and charts that follow, which are based on both experimental observations and computer simulations.

Figure 6C:
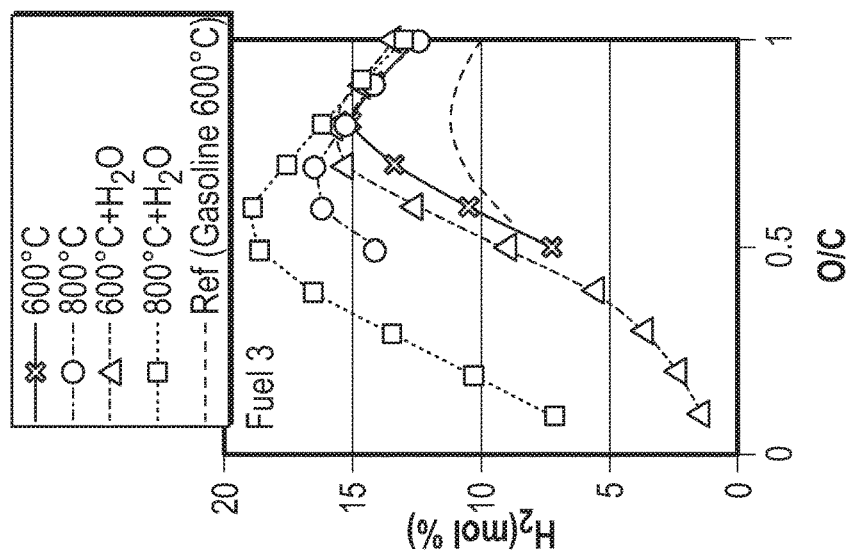
FIGS. 6A, 6B and 6C are comparative plots of hydrogen production from the catalytic reforming of exhaust gases from three different fuel blends at two different temperatures, both with and without water injection to the reformer.
Figure 6B:
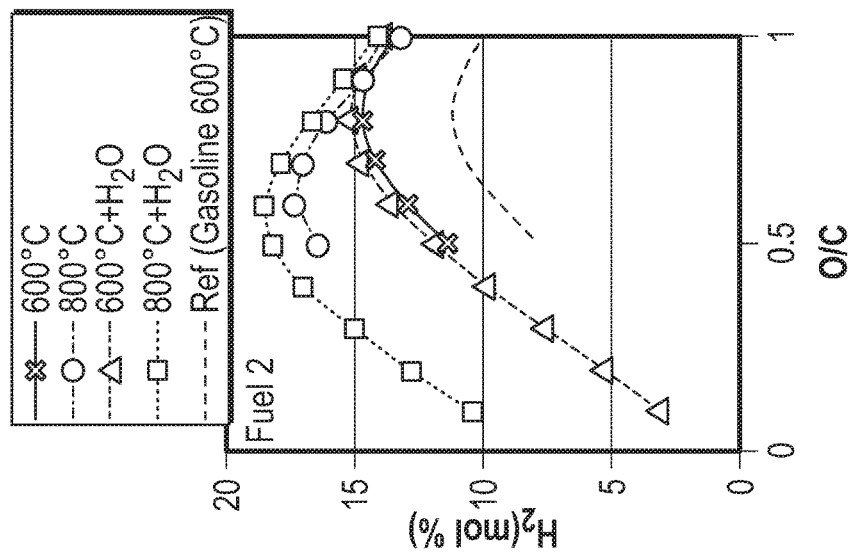
Figure 6A:
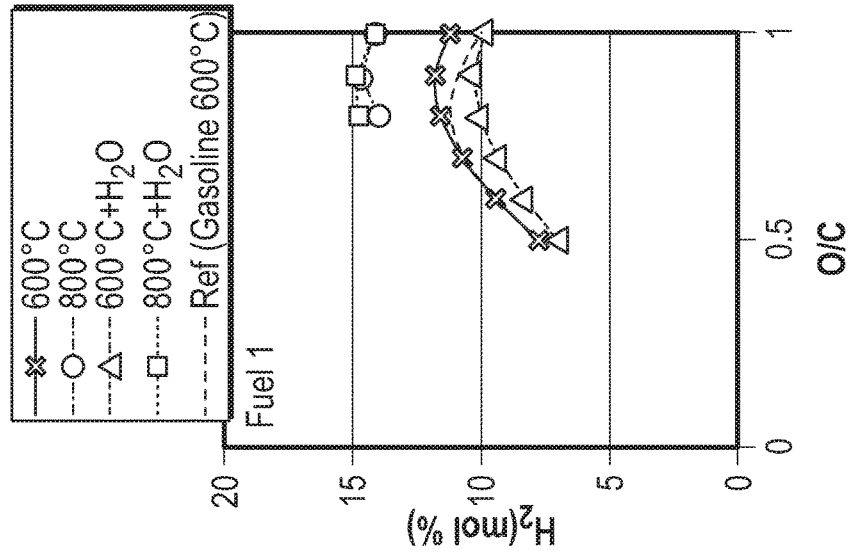

Referring to FIGS. 6A, 6B and 6C, this series of plots depicts the mols of $H_2$ produced by the exhaust gas reforming method using three different fuels with and without water injection, and where the ratio of oxygen-to-carbon (O/C) varies from about 0.1:1 to 1:1. The exhaust gas was passed in contact with a catalyst containing rhodium prepared as described above. As shown in the legend accompanying FIG. 6B, the dashed line in each of the figures represents conventional gasoline at 600° C. that serves as a reference against which to compare the other three fuels. In each case, the plots for water injection are marked by triangles and squares. The exhausts of each of the three fuels was subjected to catalytic reforming at 600° C. and 800° C. both with and without water injection.

At the higher temperature of 800° C., the Fuel 1 exhaust produced about the same amount of $H_2$ for the same O/C ratio, and at 600° C. the exhaust of Fuel 1 produced somewhat less $H_2$ when water was injected. More $H_2$ was consistently produced at the higher temperature.

Referring to the plots of FIG. 6B, it will be seen that the exhaust gases of Fuel 2 produced about the same mol % of $H_2$ at the 600° C. and at 800° C., respectively. Although the higher operating temperature 800° C. vs. 600° C. produced more $H_2$ up to an O/C ratio of about 0.5, as the ratio approached 1, all of the $H_2$ production curves diminished and began to merge.

The plot of FIG. 6C for Fuel 3 is similar to that of Fuel 2 as measured by $H_2$ production relative to the two temperatures, and also to the addition of water which resulted in somewhat greater hydrogen production at both temperatures than was obtained in the reformate without water addition, for the same O/C ratio.

The maximum amount of hydrogen was typically observed at an oxygen-to-carbon (O/C) ratio of less than 1 and 0.5 or greater. At lower oxygen-to-carbon ratios insufficient heat is available from partial oxidation reactions to start the reforming process, and at higher oxygen-to-carbon ratios complete oxidation begins to occur diminishing hydrogen selectivity.

Selected physical properties of the fuels tested with the results reported in FIGS. 6A, 6B and 6C are presented in Table 3 below. It will be noted that the conventional gasoline blend included 25% aromatics and Fuels 1, 2 and 3 had decreasing amounts of aromatics, with none present in Fuel 3. The O/C ratio of Fuel 3 was 0.25 due to the presence of alcohol in the blend. Fuel 2 had the highest net heating value (MJ/kg) and the lowest density.

TABLE 3

Properties of fuels

| Property | Gasoline | Fuel 1 | Fuel 2 | Fuel 3 |
|---|---|---|---|---|
| Density (g/mL) | ~0.736 | 0.705 | 0.6608 | 0.806 |
| H/C ratio | ~1.88 | 2.124 | 2.3067 | 2.5 |
| O/C ratio | 0 | 0 | 0 | 0.25 |
| Net heating value (MJ/kg) | ~42.3 | 43.363 | 44.786 | 33.075 |
| Aromatics (LV%) | ~25 | 10 | 1 | 0 |

Figure 7:
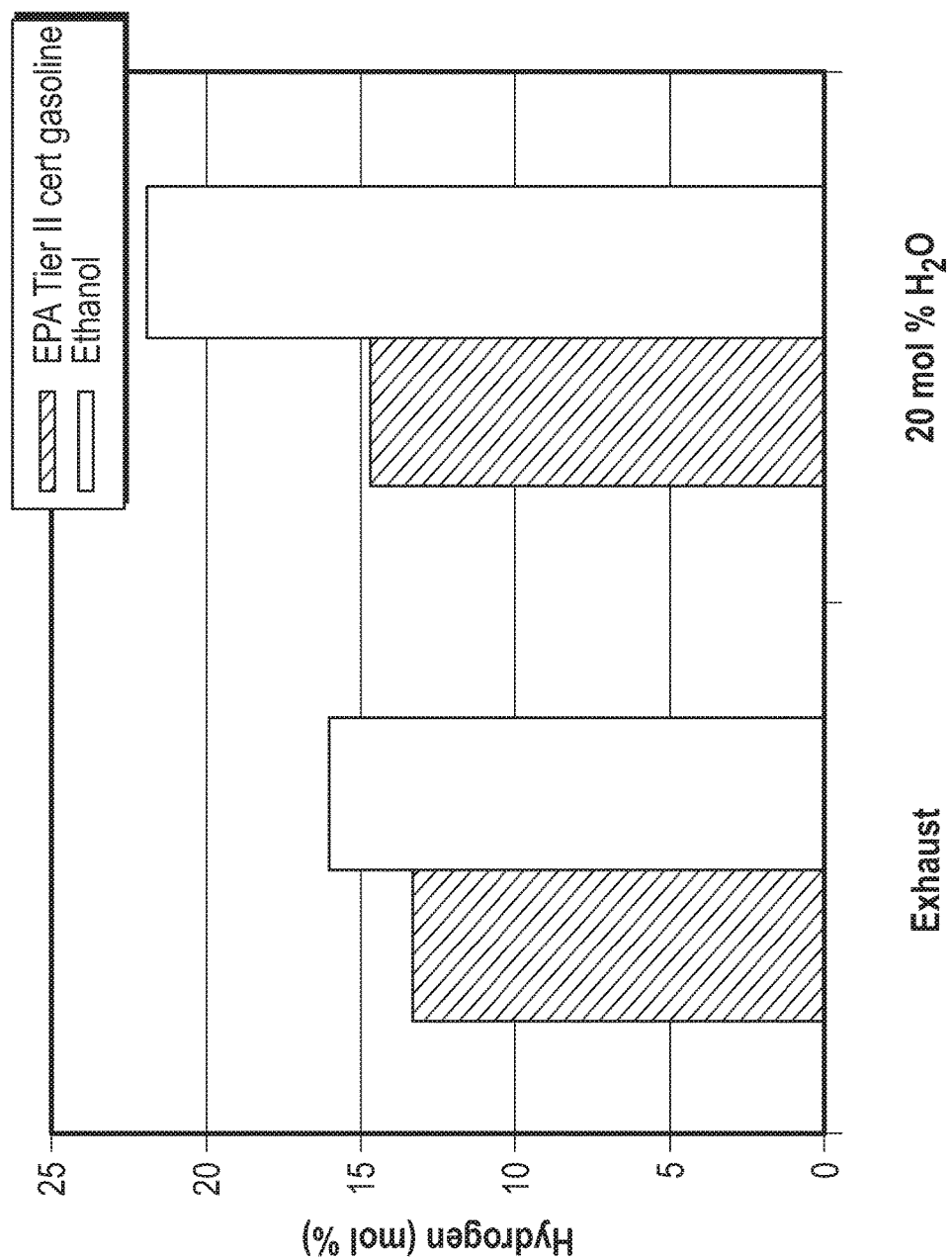
FIG. 7 are comparative graphs showing the effect on hydrogen yield resulting from water enrichment of gasoline and ethanol fuel.

The effect of water enrichment on hydrogen yield is graphically illustrated in FIG. 7. As noted above in the data for the physical characteristics of Fuel 3 and the results of the tests shown in FIG. 6C, the O/C ratio was 0.25 reflecting the presence of ethanol. The water enrichment effect on hydrogen yield at 800° C. for gasoline and for ethanol alone (not part of the blend as in Fuel 3) at 20 mol % water produces an increase of about 6 mol %, or about 38%.

Figure 8:
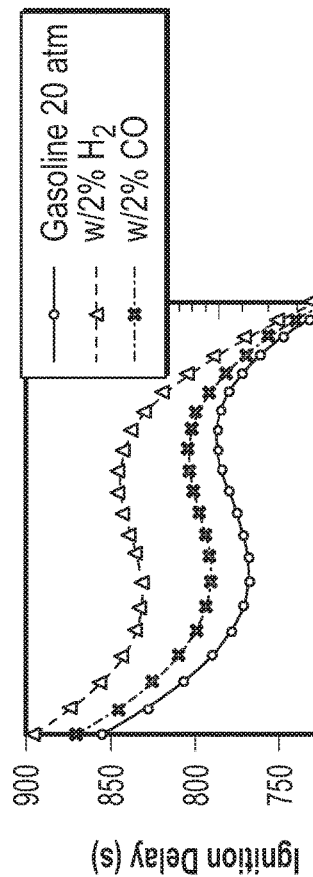
FIG. 8 includes plots of the predicted research octane number for a gasoline blend supplemented with $H_2$ and the same blend supplemented with CO.

With reference to the plot of FIG. 8, a comparison of the constant volume ignition delay in seconds (S) is modeled for a conventional gasoline blend at 20 atm as a function of inverse temperature over the range of from 0.0143 $K^{-1}$ to 0.111 $K^{-1}$. The equivalent temperatures, with until of K over the range of from 700° C. to 900° C., are shown below the x-axis. The same fuel with two (2)% by volume of $H_2$ (top curve) and two (2)% by volume of CO (middle curve) As modeled, the data depicts a significant advantage in terms of an increase in the ignition delay with $H_2$ addition when compared to CO, particularly in the temperature range of about 725° F. to 850° F.

Figure 9:
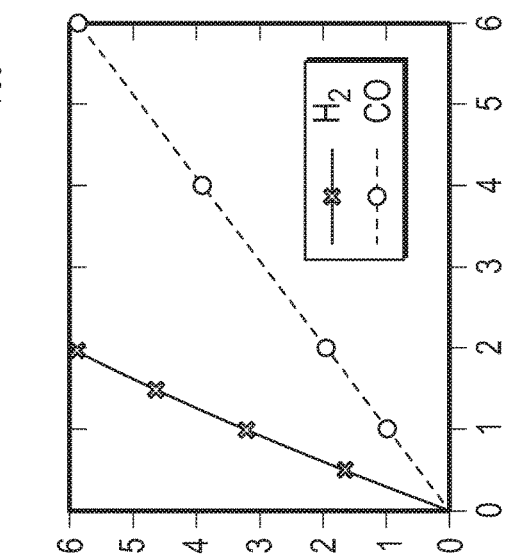
FIG. 9 provides comparative plots of the ignition delay modeled for (a) a conventional fuel blend, (b) the same fuel with $H_2$ and (c) the same fuel with CO over temperatures ranging from 700° C. to 900° C.

Referring now to FIG. 9, the plots of the predicted research octane number (RON) for the same gasoline blend supplemented with increasing amounts of $H_2$ and CO, as expressed in mol %, indicate that the same increase in RON is obtained with the addition of about one-third the molar amount of $H_2$, i.e., about three times more CO than $H_2$ is required to achieve the same predicted increase in RON.

Figure 10:
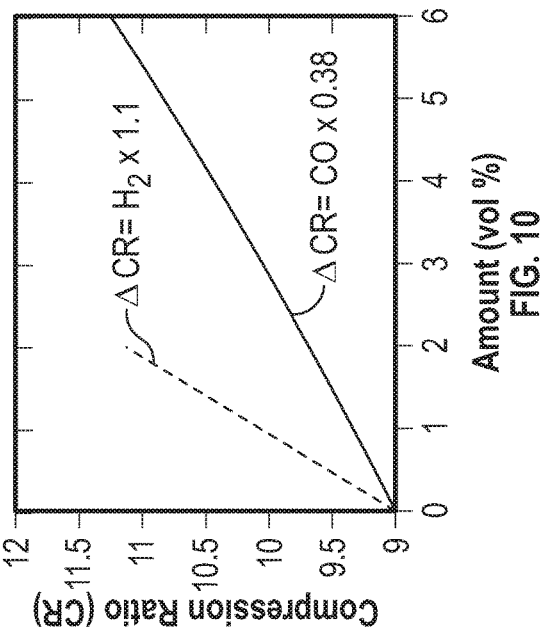
FIG. 10 is a plot of the predicted increase in knock-limited compression ratios (CR) based upon the volume percent of $H_2$ and CO present in an engine cylinder.

The plot of FIG. 10 depicts the relative difference in the predicted increase in spark-ignited gasoline engine knock-limited compression ratios based upon the volume percent of $H_2$ and CO present in the cylinder. As shown there, the rate of the incremental increase in the compression ratio is much greater for a given volume of $H_2$ than CO. The results of these plots are similar to those of FIG. 8 which showed the increase in RON based on the mol % of $H_2$ and CO.

Two ternary plots were prepared (not shown) to predict (1) hydrogen yield and (2) hydrogen selectivity as a function of fuel composition for blends of isooctane, n-heptane and toluene. In accordance with the first plot, the predicted yield of $H_2$ increases as the amount of the aromatic toluene in the blend is reduced. As noted above, this effect in fuel blending to increase hydrogen yield can be maximized by reducing aromatic blending components to the extent permitted by such practical considerations as economics and the availability of non-aromatic components to the refinery operator.

The ternary plot of the predicted hydrogen selectively expressed as $H_2/H_2O$ (mol) for the blend of isooctane, n-heptane and toluene also indicated an increase in hydrogen selectivity as the amount of the aromatic toluene in the blend is reduced.

The comparative charts of FIGS. 11A, 11B and 11C show the hydrogen yield as a function of the oxygen-to-carbon and $H_2O$ (steam)-to-carbon ratio at three temperatures: 400° C., 600° C. and 800° C. for Fuel 1 of FIG. 6A. The charts of FIGS. 11A-11C show that the optimal hydrogen production (as indicated by the lightest shading) is at the highest temperature, 800° C. and at an O/C ratio in the range of from 0.8 to 1.0.

Figure 12A:
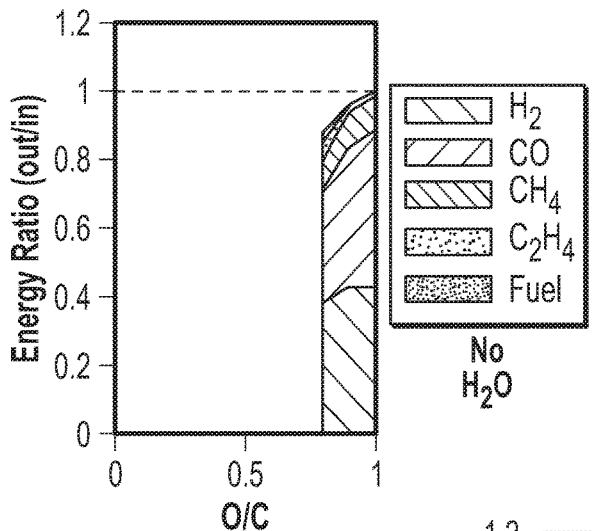
FIG. 12A-12F are a series of charts depicting the energy ratio for fuel compositions with the blending components shown in the key inset in FIG. 14A with no water injection (upper row) and with water injection (lower row) and an increase in the O/C molar ratio from left to right.
Figure 12B:
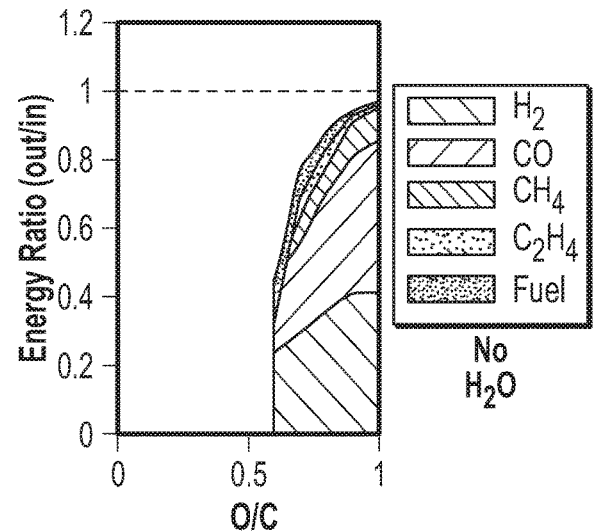
Figure 12C:
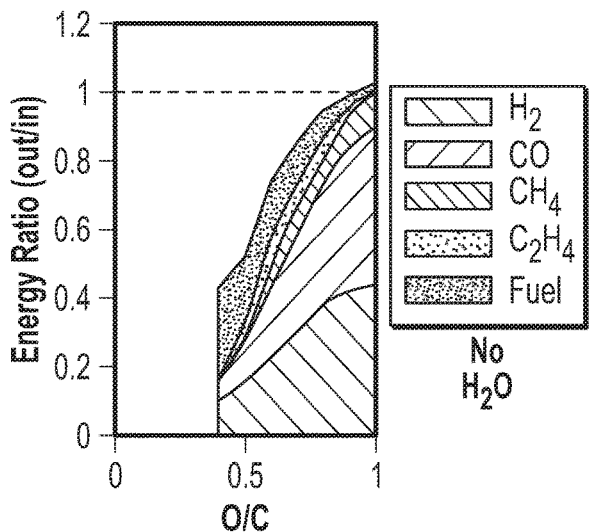
Figure 12D:
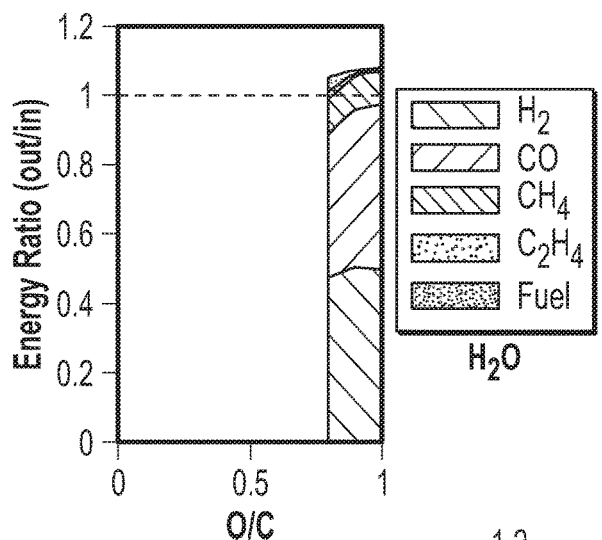
Figure 12E:
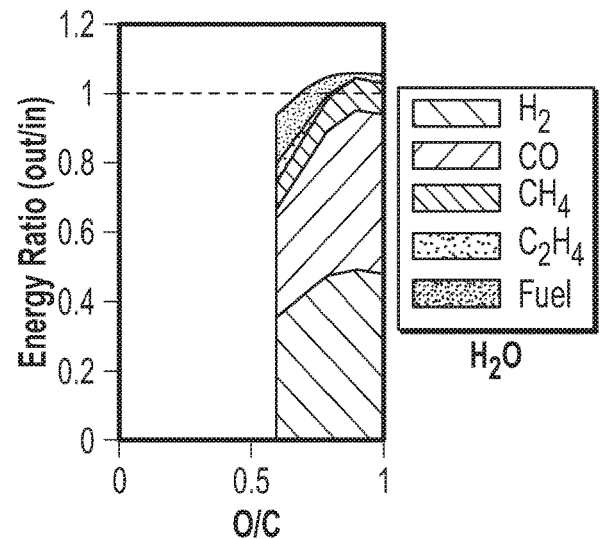
Figure 12F:
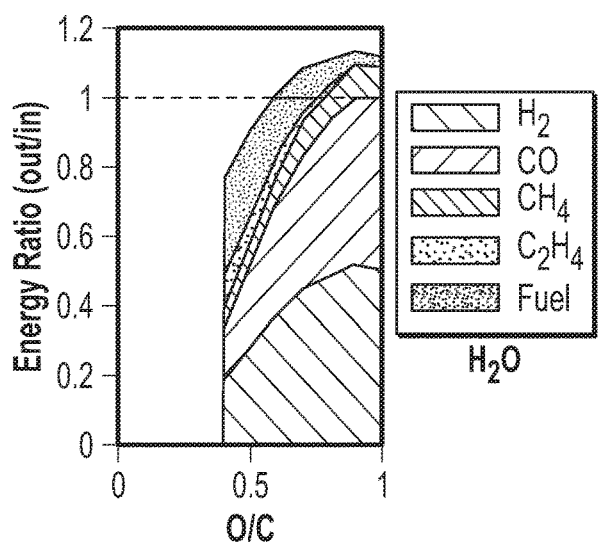

Referring now to the series of comparative charts of FIGS. 12A-12F depicting the Energy Ratio (out/in) for the compositions identified in the shading key inset, FIGS. 12A-12C include no water and FIGS. 12D-12F are operated with water injection. FIGS. 12A-12F show the energy balance for three different fueling cases as a function of the O/C ratio. FIG. 12A depicts low fueling at 800° C., i.e., at a S/C ratio of 0.50. FIG. 12B depicts medium fueling at 800° C., i.e., at a S/C ratio of 0.67. FIG. 12C depicts high fueling at 800° C., i.e., at a S/C ratio of 1.00. FIG. 14C depicts low fueling at 800° C., i.e., at a S/C ratio of 1.50. FIG. 12D depicts medium fueling at 800° C., i.e., at a S/C ratio of 2.00. FIG. 12E depicts high fueling at 800° C., i.e., at a S/C ratio of 3.00. The contribution of each product component of the reformate is shown in a different shade as a fraction of the total input (fuel) energy. Each of the six plots shows the same general trend, with the energy balance, defined as energy out divided by energy in, initially increasing as the oxygen-to-carbon ratio is increased and reaching a maximum at or near 1.0. However, the plots with water injection exhibit a higher energy balance than the corresponding plot without water injection. This is due to the endothermic steam reforming reactions of water with fuel, which convert gas enthalpy into chemical potential energy via thermochemical recuperation.

Figure 13:
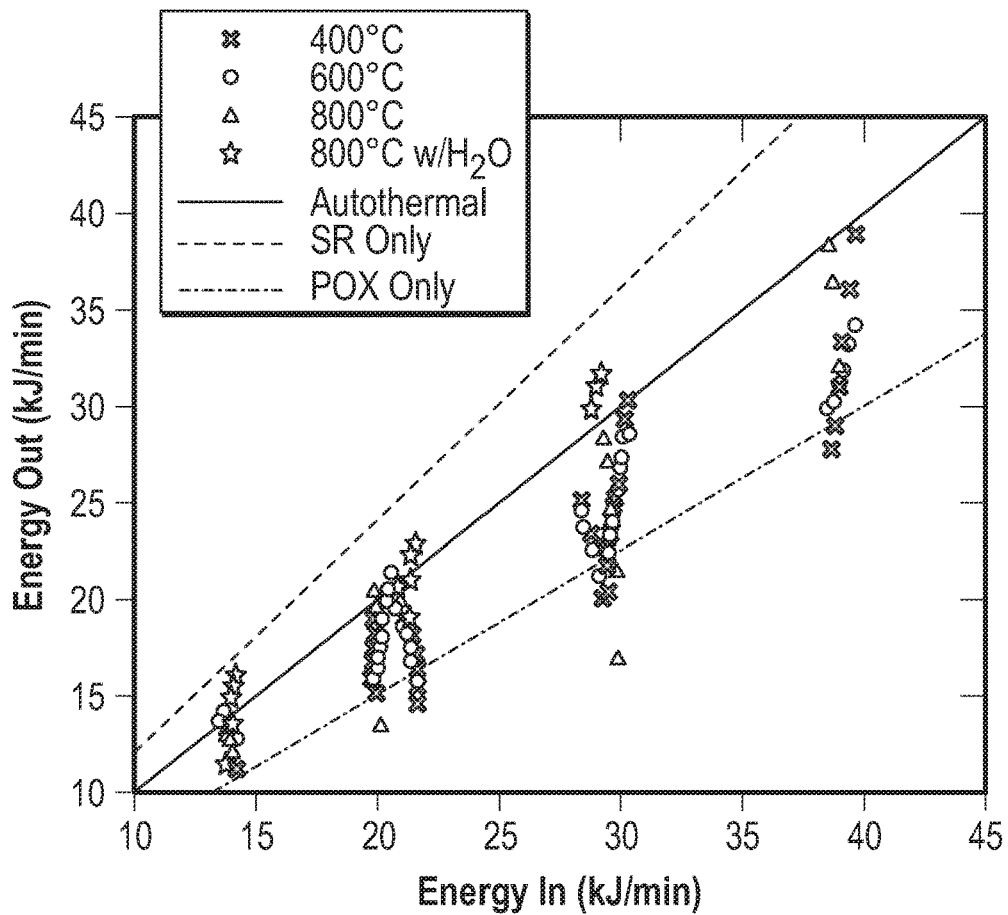
FIG. 13 is a chart depicting the energy balance for Fuel 1 with and without the addition of water for the three temperatures indicated.

Referring now to the energy balance diagram of FIG. 13 for Fuel 1, the three theoretical conditions of autothermal, steam reforming only (SR) and partial oxidation only (POX) are depicted. The data points for operation at 400° C. and 600° C. are without water injection, and the data points at 800° C. are for operation both with water (star) and without water (triangle). Of these different temperature cases, the 800° C. data points with water injection (star) showed the highest energy balance, even exceeding 1.0 in some cases. This indicates that use of fuel reforming with water injection has added to the chemical potential energy of the fuel, providing a further improvement in energy efficiency.

Figure 14:
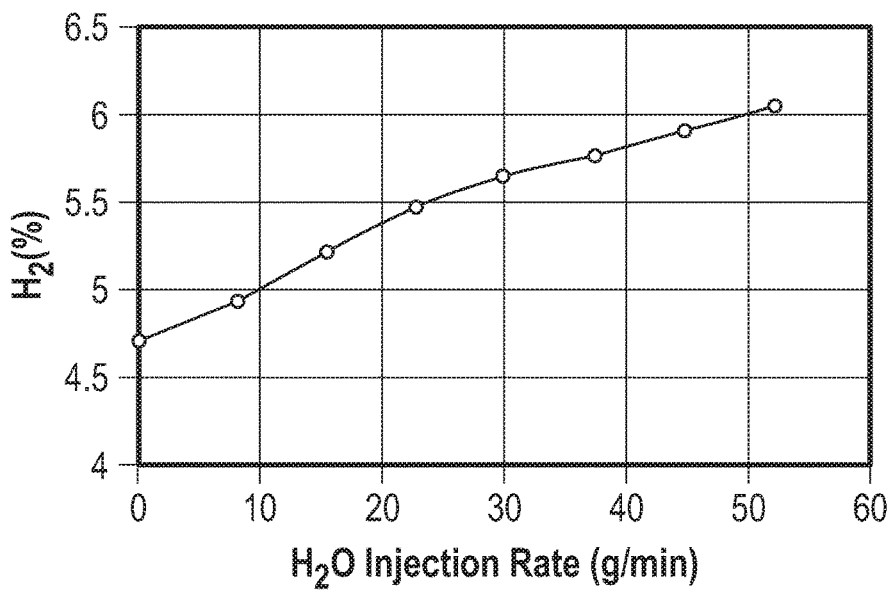
FIG. 14 is a plot of hydrogen production at an increasing rate of water injection with a rich fuel mixture.

The plot of FIG. 14 shows the effect of increasing the rate of water injection of g/min on the hydrogen produced in mol % for a rich fuel mixture, i.e., $\lambda=0.7$. Under the conditions depicted, the injection of water produces an immediate and steady increase in the hydrogen concentration in the cylinder over the entire range.

Figure 15:
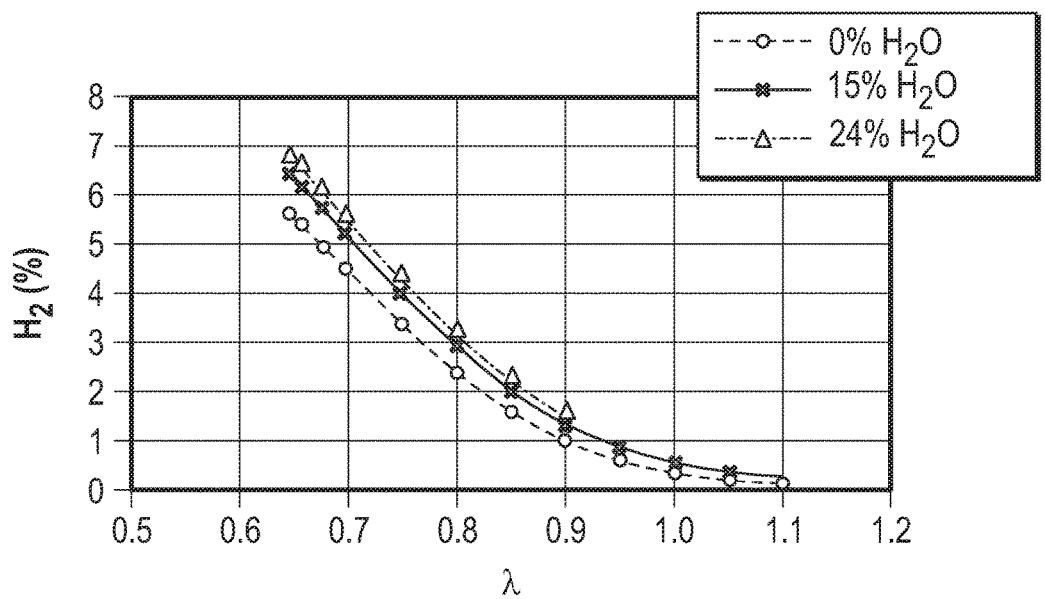
FIG. 15 is a plot showing the hydrogen concentration as a function of the air-to-fuel equivalence ratio (λ) with no water, and with 15% and 24% of water.

The effect on hydrogen production as a function of the relative in-cylinder air-to-fuel equivalence ratio ($\lambda$) is shown in FIG. 15. As can be seen from the chart, where the lower line is a plot without water injection, there is increased hydrogen production across all equivalence ratios with water injection at the 15% and 24% levels, respectively.

Figure 16:
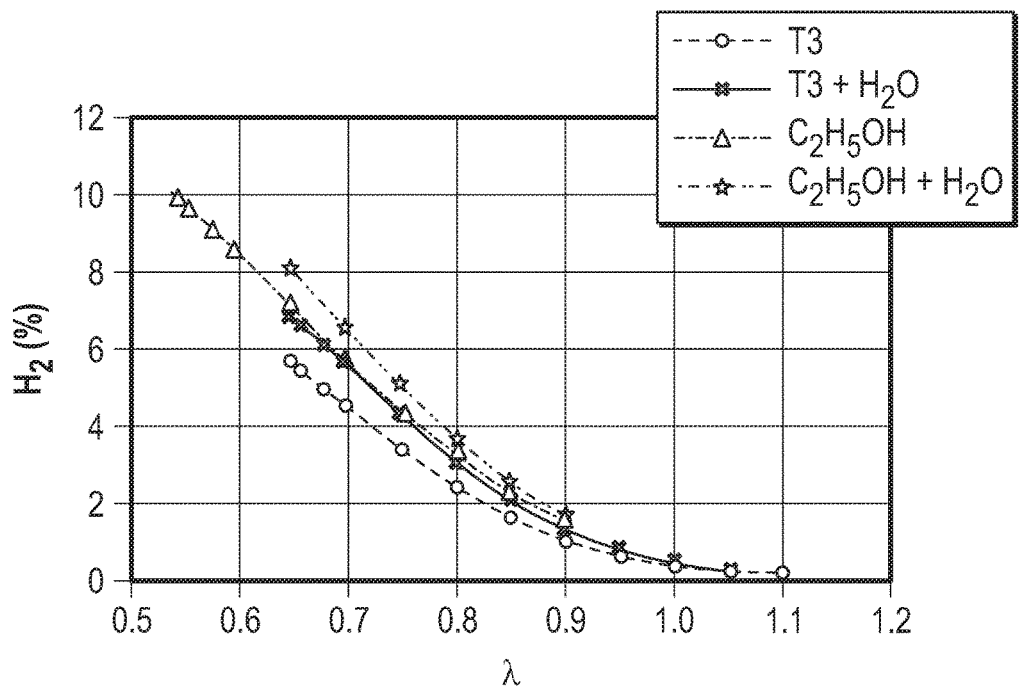
FIG. 16 is a plot of hydrogen production in mol % as a function of the air-to-fuel equivalence ratio (λ) for gasoline and ethanol with and without water.

Referring to FIG. 16, it will be seen that the production of hydrogen as a function of the air-to-fuel equivalence ratio ($\lambda$) for gasoline (T3) and ethanol both increase with water injection. It is noted that the production of hydrogen from ethanol without water is relatively greater than that of gasoline with or without water.

Figure 17:
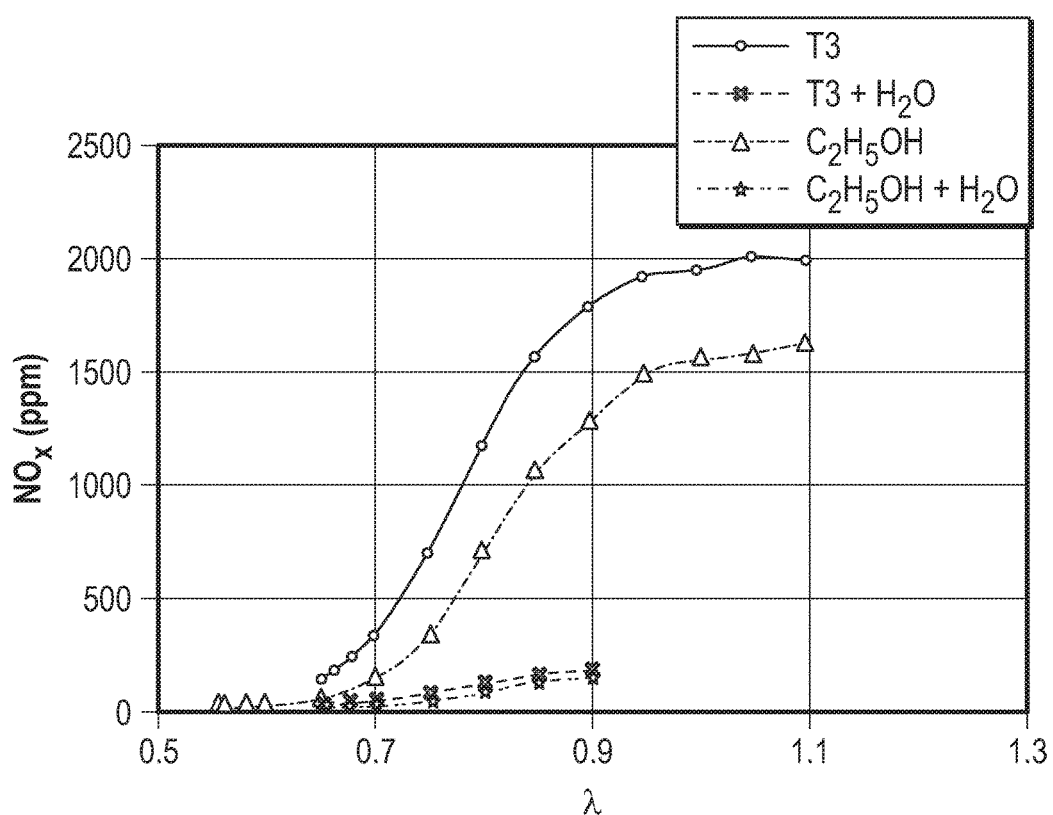
FIG. 17 is a plot of $NO_x$ emissions in parts per million (ppm) as a function of the air-to-fuel equivalence ratio for gasoline and ethanol fueling with and without water injection.

Referring now to the chart of FIG. 17, the beneficial effect of water injection in reducing $NO_x$ emissions as measured in ppm as a function of the air-to-fuel equivalence ratio ($\lambda$) is clearly demonstrated. As the relative air-to-fuel equivalence ratio is increased beyond the value of about 0.7, the injection of water with both gasoline and ethanol markedly reduces the $NO_x$ emissions.

The data presented above in the tables and in the graphs and charts of the figures reflect the advantages achieved by on-board reforming with the injection of water to improve the operation of a gasoline fueled spark-ignited internal combustion engine.

The methods and systems of the present invention have been described in detail above and in the attached drawings; however, modifications will be apparent to those of ordinary skill in the art from this description and the scope of protection for the invention is to be determined by the claims that follow.

The invention claimed is:

1. A method of operating a spark-ignited, gasoline-fueled internal combustion engine (ICE) having an associated on-board catalytic reformer, characterized by:
   a. pre-heating a mixture comprising a predetermined amount of water and fuel in a vaporizer to produce a vaporized steam and fuel mixture;
   b. introducing the vaporized steam and fuel mixture and a predetermined amount of air into the on-board catalytic reformer to produce a reformate stream comprising hydrogen and carbon monoxide, the carbon monoxide being subjected to the water-gas shift reaction to produce additional hydrogen and carbon dioxide to form a hydrogen-enhanced reformate stream;
   c. injecting water into the reformate stream;

d. introducing the hydrogen-enhanced reformate stream with injected water, fresh fuel and ambient air into an intake manifold of the ICE; and e. combusting the enhanced reformate, air and fuel in the presence of the injected water in the ICE to produce a hot exhaust gas stream.

2. The method of claim 1 which includes reducing the temperature of the reformate stream to produce a cooled reformate stream.

3. The method of claim 1 in which at least a portion of the exhaust gas stream of step 1(e) is passed to an exhaust gas recycle (EGR) loop and introduced into the intake manifold of the ICE.

4. The method of claim 1 in which the ICE is operated in conjunction with a turbocharger or a supercharger.

5. A method of operating a spark-ignited, gasoline-fueled internal combustion engine (ICE) having at least one dedicated engine cylinder that operates as a reforming cylinder that is a source of recycled exhaust gas, characterized by:

a. mixing engine intake air and a cooled exhaust gas recycle (EGR) stream in an EGR mixer to produce a mixed air/EGR stream;

b. introducing the mixed air/EGR stream into the intake manifold of the ICE for passage to the cylinders of the ICE;

c. injecting water vapor into the air/EGR mixture in the intake manifold to produce a mixed stream of air, EGR and water vapor;

d. injecting an amount of fuel into the at least one dedicated exhaust gas recycle reforming cylinder with the air, EGR and water vapor mixture before or during an intake stroke and prior to the combustion cycle to provide a fuel-rich mixture;

e. combusting and reforming the air, EGR, steam and fuel-rich mixture in the at least one dedicated exhaust gas recycle reforming cylinder to produce a mixture comprising hydrogen and carbon monoxide, the carbon monoxide being subjected to the water-gas shift reaction to produce additional hydrogen and carbon dioxide which is combusted in the reforming cylinder to produce a hot exhaust gas stream;

f. cooling the hot exhaust gas stream containing hydrogen and carbon monoxide to produce the cooled recirculated exhaust gas stream of step (a) and passing the cooled exhaust gas stream to the ERG mixer; and g. injecting a predetermined amount of fuel into the remaining ICE cylinders for complete combustion with the air, ERG and water vapor present in those cylinders and discharging the exhaust gas stream into the atmosphere.

6. The method of claim 5 in which the hot exhaust gas stream is passed to an on-board heat exchanger or automotive intercooler for cooling to a temperature within a predetermined range.

7. A method of operating a spark-ignited, gasoline-fueled internal combustion engine (ICE) having at least one dedicated exhaust gas recirculation cylinder that is a source of recycled exhaust gas and an associated on-board catalytic reformer, characterized by:

a. injecting water vapor into a mixture of a predetermined amount of fuel, air and cooled reformate produced by the on-board catalytic reformer into the intake manifold of the ICE for combustion under fuel-lean/oxygen-rich conditions;

b. combusting the fuel, air and a cooled reformate stream in the respective cylinders of the ICE to produce a hot exhaust gas stream containing residual oxygen;

c. injecting fuel (i) into the at least one dedicated exhaust gas recirculation cylinder with the combustion products, or (ii) into the hot exhaust gas stream at the dedicated exhaust gas recirculation cylinder exhaust gas port, or (iii) into the hot exhaust gas stream from the at least one dedicated exhaust gas recirculation cylinder upstream of the on-board reformer;

d. passing the hot exhaust gas stream containing fuel and residual oxygen from the at least one dedicated exhaust gas recirculation cylinder to the on-board reformer;

e. catalytically reforming the hot exhaust gas stream containing fuel and residual oxygen in the on-board reformer to produce a reformate stream comprising hydrogen and carbon monoxide;

f. cooling the reformate stream to produce the cooled reformate of step (b);

g. mixing an engine intake air stream and the cooled reformate stream to produce a mixed air/reformate intake stream; and h. introducing the mixed air/reformate mixture into the intake manifold of the ICE for passage to the cylinders of the ICE and combustion with injected fuel.

8. The method of claim 7 in which the hot exhaust gas stream is passed to an on-board heat exchanger for cooling to a temperature within a predetermined range.

9. A method of operating a spark-ignited, gasoline-fueled internal combustion engine (ICE) having an on-board catalytic reformer, characterized by:

a. operating the ICE under fuel-lean/oxygen-rich conditions to produce a hot exhaust gas stream that contains residual oxygen;

b. discharging a predetermined portion of the hot exhaust gas stream into the atmosphere;

c. injecting fuel into the remaining portion of the hot exhaust gas stream containing residual oxygen upstream of the reformer to produce a mixed fuel and hot exhaust gas recycle (EGR) stream;

d. catalytically reforming the fuel and hot exhaust gas mixture in the reformer to produce a reformate stream comprising hydrogen and carbon monoxide;

e. cooling the reformate stream to produce a cooled reformate stream;

f. mixing an engine intake air stream and the cooled reformate stream in an ERG mixer to produce a mixed cooled reformate and air stream;

g. introducing the cooled reformate and air mixture into the intake manifold of the ICE;

h. injecting water into the combustible fuel mixture in the intake manifold with the cooled reformate hydrogen/carbon monoxide and air mixture;

i. injecting fuel into the intake manifold or engine cylinder of the ICE; and j. igniting the combustible mixture to produce the hot exhaust gas stream of step (a) that contains excess oxygen.

10. The method of claim 9 in which the hot exhaust gas stream is passed to an on-board heat exchanger for cooling to a temperature within a predetermined range.

11. The method of claim 7 in which additional intake air is introduced into the ICE before the combustion of step (f) to provide supplemental oxygen for the reforming step.

12. The method of claim 1 in which the fuel is present in an amount in the range of from 1 mol % to 2.5 mol % of the total mixture.

13. The method of claim 1 in which the ratio of oxygen-to-carbon during reforming is in the range of from 0.5:1 to 1:1.

14. The method of claim 1 in which the molar ratio of $H_2O$ to $O_2$ during reforming is greater than 1:1.

15. The method of claim 5, wherein the molar $H_2O$ concentration during reforming is 10-30%.

16. The method of claim 1, wherein the catalyst comprises at least one active metal selected from groups VI, VII and VIIIB of the Periodic Table.

17. The method of claim 1, wherein the catalytic reforming takes place at a space velocity in the range of from 10,000 $hr^{-1}$ to 100,000 $hr^{-1}$.

18. The method of claim 1, wherein the fuel comprises aromatic hydrocarbons in the range of from 0%-20% by volume.

19. The method of claim 1, wherein the fuel comprises olefinic hydrocarbons in the range of from 0%-5% by volume.

20. The method of claim 1, wherein the fuel comprises an oxygenated hydrocarbon compound.

* * * * *